Figure 1:
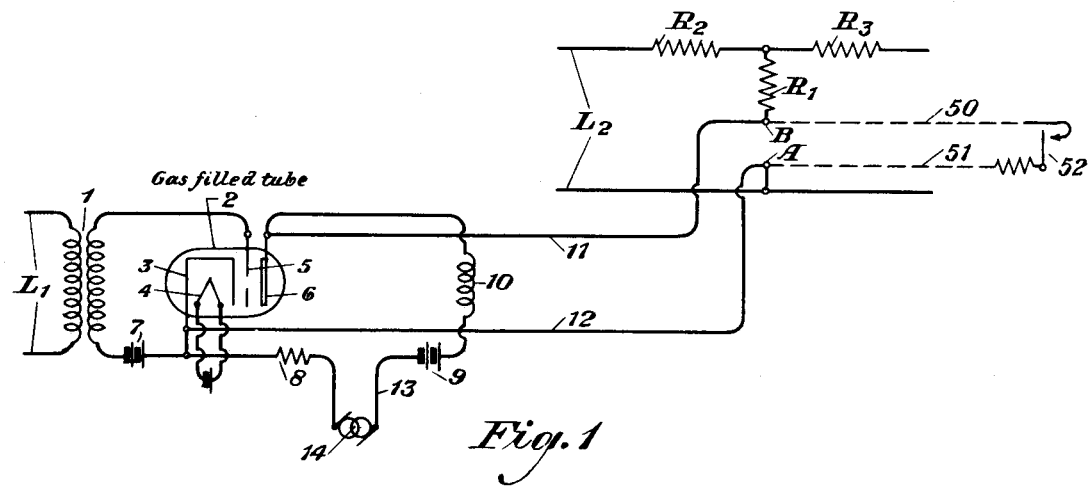

June 26, 1934.  C. S. DEMAREST  1,964,110
CONTROL SYSTEM
Filed Nov. 10, 1931

INVENTOR
*C. S. Demarest*
BY
ATTORNEY

Patented June 26, 1934

1,964,110

UNITED STATES PATENT OFFICE 1,964,110

CONTROL SYSTEM

Charles S. Demarest, Ridgewood, N. J., assignor to American Telephone and Telegraph Company, a corporation of New York Application November 10, 1931, Serial No. 574,206

3 Claims. (Cl. 175—320)

The invention relates to electrical circuits and more particularly to improved means whereby the current in one circuit may be utilized to control connections in another circuit without utilizing mechanical relay means.

Heretofore, in opening, closing, or transferring connections in one circuit by means of current in another circuit, it has been the practice to utilize electromagnetic relays. These electromagnetic relays operate armatures against spring pressure to open, close and transfer circuit connections and require careful mechanical adjustment of the armatures and springs to insure operation in the desired manner. Such adjustments do not remain fixed and satisfactory performance sometimes requires frequent attention to their maintenance when used in telephone circuits. Also, the speed of operation of such relays is dependent partially upon the mechanical adjustments and is, therefore, variable and not readily made so precise as may sometimes be desired. The arrangements of the invention provide a device that will perform the switching functions of a relay and will at the same time be free from the above referred to limitations of mechanical moving parts with respect to stability and accuracy of performance. The arrangements of the invention are particularly advantageous when utilized in transmission systems, such for example as telephone and telegraph circuits.

The arrangements of the invention take advantage of the property of gas filled tubes, wherein the resistance from the cathode to the plate is changed from a high value to a relatively low value when an arc is established by the applied current, in such a way that the electrical path from cathode to plate may be used as a substitute for relay contacts to provide a closed circuit in certain circuit arrangements.

The switching device of the invention may be utilized in various types of circuit arrangements. When the operation of the gas filled tube is desired chiefly for the purpose of closing a direct current circuit, as in operating a secondary relay, lighting a lamp, or operating some other similar device, the direct current responsive device might be put directly in series with the plate circuit of the gas filled tube. To specifically illustrate a desirable utilization of the arrangements it is pointed out that an element of a transmission circuit, such as one branch of artificial line, may be closed by the action of the gas filled tube by utilizing the path established from cathode to plate, when the arc occurs due to the applied current, as a shunt path to close the desired circuit.

The arrangements of the invention may also be utilized for opening a desired circuit or for transferring connections so that one circuit is opened and another closed at a common point, as is done with an ordinary relay by the use of an armature with front and back contacts. A specific illustration is hereinafter given of the last mentioned arrangements in connection with control of an artificial line. Other objects, uses and features of the invention will appear more fully from the detailed description thereof hereinafter given.

Figure 2:
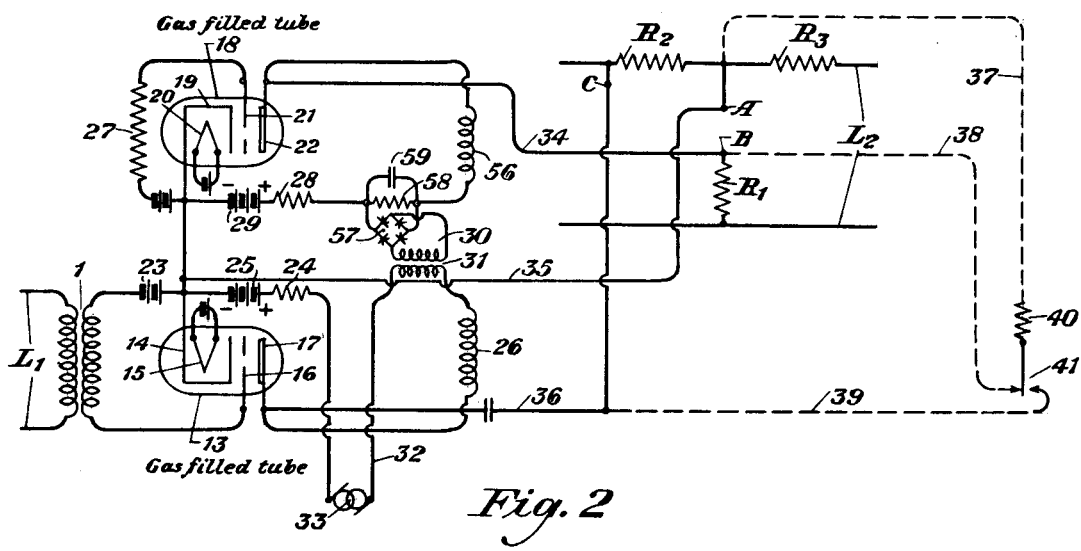

The invention may be more fully understood from the following description together with the accompanying drawing in the Figures 1 and 2 of which the invention is illustrated. Fig. 1 is a circuit diagram showing the arrangements of the invention utilized to control elements of a transmission line, such as an artificial line. Fig. 2 is a modification of the arrangements of Fig. 1. Similar reference characters have been utilized to denote like parts in all of the figures.

In Fig. 1 is shown the application of the gas filled tube arrangements of the invention in a case in which its operation is desired to effectively close the circuit between points A and B in a transmission network in the line $L_a$. With this arrangement signaling current transmitted over the line $L_1$ may be utilized to control the transmission over line $L_2$ without the use of relays. The line $L_1$ is shown connected by transformer 1 to the input circuit of a gas filled tube 2 which may operate, if desired, as an amplifier detector. The tube would have a cathode 3, a heating element 4 for the cathode, a grid 5, and a plate electrode 6. A grid battery 7 is shown. In the plate circuit would be the current limiting resistance 8, the battery 9, and the inductance 10. A circuit 13 connected to a suitable alternating current source 14 might be connected to the plate circuit for purposes of quenching the arc as will be pointed out hereinafter. The plate circuit of the gas filled tube would be extended by conductors 11 and 12 to the points A and B of a transmission network in line $L_a$. This network might comprise the resistance elements $R_2$ and $R_3$ connected in series in one side of the line and a shunt element $R_1$ adapted to be bridged across the line when a connection was effectively established between points A and B. By effectively connecting or disconnecting the shunt element $R_1$ across the line the impedance of the network may be varied to control transmission in the line.

With the above arrangement signaling current transmitted over line $L_1$ will cause an arc to be formed between the electrodes of tube 2. This will materially reduce the resistance between the cathode and plate of the tube. As points A and B of the transmission network are connected to the cathode and plate of the tube the establishment of the low resistance of the arc between these points will effectively connect the resistance $R_1$ in shunt between the two sides of the line. Such an arrangement would correspond to the operation by a relay (not shown) of the contacts 52 to establish a low resistance connection between points A and B as indicated by the dotted lines 50 and 51. The resistance $R_1$ in the network is chosen to be of such a value that when connected in series with the small resistance across the arc of the tube, it provides the desired total resistance in the branch of the network in which it is used. The inductance 10 in the plate circuit of the tube may be of such value as to present high impedance to currents of the character desired to be transmitted over the network. As has been heretofore pointed out, the plate circuit of the gas filled tube is shown connected by circuit 13 through a source 14 of alternating current. This is for the purpose of quenching the arc in the tube after the input voltage on the grid is removed. The source 14 will be of suitable frequency and voltage so that when the input voltage on the grid is applied continuously the arc will be quenched intermittently and when the input voltage on the grid is removed the arc will be extinguished and the functioning of the tube stopped. The arc in the tube which occurs when signaling current is applied over line $L_1$ will materially reduce the impedance between points A and B and will effectively connect resistance $R_1$ across line $L_2$. If desired, the electrical constants of the plate-cathode circuit of the tube may be chosen so as to control the time required to establish or quench the arc, thus replacing mechanical means for obtaining slow operation or release.

In Fig. 2 is shown a modification of the arrangements of the invention which provides means for opening a desired circuit or for transferring connections so that one circuit is opened and another closed at a common point, as has been done heretofore with an ordinary relay by the use of an armature with front and back contacts. The arrangements of the invention are shown, for purposes of illustration, as used for controlling a transmission network in a line $L_2$ by means of signaling currents transmitted over a line $L_1$. The arrangements utilize two gas filled tubes 13 and 18. The tube 13 would have a grid 16, a cathode 14, a heating element 15 for the cathode, and a plate 17. The tube 18 would have a cathode 19, a heating element 20 for the cathode, a grid 21, and a plate 22. The plate circuit of tube 18 includes a resistance 28, a battery 29, a resistance 58 and an induction coil 56. The resistance 58 is shunted by a condenser 59 and is connected to the circuit 30 which includes a rectifier 57 and a winding of a transformer 31. Under conditions to be pointed out hereinafter alternating current of a certain voltage from the source 33 may be applied through transformer 31 to the circuit 30. This alternating current will be rectified by the means 57 and transmitted through resistance 58 in such a manner as to oppose the potential in the plate circuit from battery 29. Under such conditions the arc existing in the tube 18 would be quenched. The input circuit of the tube 18 would include a battery and a resistance 27. The tube 18 would have its grid and plate circuits so adjusted as to maintain a continuous arc until a suitable voltage is applied across the resistance 58 in series in the plate circuit to quench the arc as pointed out above. The conditions and manner under which the arc will be quenched will be pointed out hereinafter. It will appear that when no signaling voltage is applied to line $L_1$ that the tube 18 will normally maintain a continuous arc between its cathode and plate. The cathode and plate are connected by conductors 34 and 35 to the points B and A of the transmission network in line $L_2$. The existence of the low resistance of the arc in tube 18 will in effect close a circuit between points A and B and connect the resistance element $R_1$ in shunt in the line $L_2$. The operation of tube 18 is similar in effect to the closing of a circuit between points A and B through a small resistance by means of a relay (not shown) and the contacts 41 connected by dotted lines 37 and 38 to points A and B.

Tube 13 includes in its input circuit a battery 23 and in its output circuit a resistance 24, a battery 25, an inductance 26, and a circuit 32 connected to a source of alternating current 33 for the purpose of quenching the arc in tube 13 when the voltage applied to the grid ceases. The tube 13 is arranged so as not to operate until a certain input voltage is applied to the grid from line $L_1$. When the tube operates a low resistance arc is formed from cathode to plate. The alternating current from the source 33 will quench this arc intermittently. Accordingly, as long as signaling current is applied to the grid of tube 13 a low resistance intermittent arc will exist between the cathode and plate of tube 13. When this intermittent arc is established in tube 13 the alternating current from source 33 through the transformer 31 is stepped up in the transformer 31 to a degree so that the direct current applied to resistance 58 will reduce the voltage on the plate of tube 18 to quench the arc in said tube. The condenser 59 shunted across resistance 58 is so proportioned as to maintain a continuous flow of current of sufficient magnitude through resistance 58 to keep the arc in tube 18 extinguished. This will change the arc in tube 18 from a steady one to no arc at all or in other words change the resistance between cathode and plate in tube 18 from a low resistance to a high one. From the above it will appear that as long as the signal from line $L_1$ continues, a low resistance path is established across the cathode-plate of tube 13 and the path across the cathode-plate of tube 18 is changed to a high resistance one. Accordingly, the transmission of signaling current over line $L_1$ will in effect close the circuit comprising conductors 35 and 36 connected to points A and C, and at the same time the quenching of the arc in tube 18 in effect opens the circuit between points A and B of the network. The same result might be accomplished by the operation of a relay (not shown) and the contacts 41 connected by dotted lines 37 and 39 to points A and C. With the above described arrangements of the invention the transmission in line $L_2$ may be regulated without relays by controlling the transmission network therein by signal currents transmitted over line $L_1$.

The above described uses of the invention for controlling transmission networks are merely given for purposes of illustration and the principles of the invention involved therein are not to be construed as limited to the applications or forms described. Numerous other combinations of gas filled tubes corresponding to various relay arrangements utilizing the principles of the invention may be utilized. Furthermore, various forms of such tubes could be designed having characteristics and numbers of elements adapted particularly to specific applications of the general character indicated. Accordingly, while the invention has been disclosed as embodied in certain specific forms which are deemed desirable, it is understood that it is capable of embodiment in many and other widely varied forms without departing from the spirit of the invention as defined by the appended claims.

What is claimed is:

1. A circuit and switching means for changing a connection existing between a first and a second point in said circuit to a connection between said first point and a third point in said circuit, said switching means comprising a gas filled thermionic tube having its cathode-plate circuit connected between said first and second points and having its local circuits adjusted so that normally the tube is operative and a low resistance arc exists between said cathode and plate, a second gas filled thermionic tube having its cathode-plate circuit connected between said first and third points and having its local circuits adjusted so that normally the tube is inoperative until a signal voltage is applied thereto, and means operative when said second tube is operated for rendering said first tube inoperative.

2. A circuit and switching means for changing a connection existing between a first and a second point in said circuit to a connection between said first point to a third point in said circuit, said switching means comprising a gas-filled thermionic tube having its cathode-plate circuit connected between said first and second points and having its circuits adjusted so that normally the tube is operative and a low resistance arc exists between said cathode and plate, a second gas-filled thermionic tube having its cathode-plate circuit connected between said first and third points and having its circuits adjusted so that normally the tube is inoperative until a signal voltage is applied thereto, a source of alternating current in series in the cathode-plate circuit of said second tube whereby when signaling voltage is applied to said second tube the arc established therein will be quenched intermittently, and means for inductively applying current from said source to the cathode-plate circuit of said first tube whereby when the second tube operates the voltage of said applied current will be sufficient to quench the arc existing in said first tube.

3. A circuit and switching means for changing a connection existing between a first and a second point in said circuit to a connection between said first point and a third point in said circuit, said switching means comprising a gas filled thermionic tube having its cathode plate circuit connected between said first and second points and having its local circuits adjusted so that normally the tube is operative and a low resistance arc exists between said cathode and plate, a second gas filled thermionic tube having its cathode plate circuit connected between said first and third points and having its local circuits adjusted so that normally the tube is inoperative until a signal voltage is applied thereto, a second circuit and means controlled by signaling currents transmitted over said second circuit for controlling the energization and deenergization of said tubes.

CHARLES S. DEMAREST.